(12) United States Patent
Bhatti et al.

(10) Patent No.: US 6,381,973 B1
(45) Date of Patent: May 7, 2002

(54) VEHICLE AIR CYCLE AIR CONDITIONING SYSTEM

(75) Inventors: Mohinder Singh Bhatti, Amherst; John F. Wurster, Irving; Dennis Lee Farley, Lockport, all of NY (US)

(73) Assignee: Delphi Technologies, Inc., Troy, MI (US)

( * ) Notice: Subject to any disclaimer, the term of this patent is extended or adjusted under 35 U.S.C. 154(b) by 24 days.

(21) Appl. No.: 09/710,258

(22) Filed: Oct. 2, 2000

Related U.S. Application Data

(60) Provisional application No. 60/157,576, filed on Oct. 4, 1999.

(51) Int. Cl.[7] .................................................. F28B 9/00
(52) U.S. Cl. .............................. 62/172; 61/401; 61/402; 61/513
(58) Field of Search ........................ 62/172, 401, 402, 62/179, 239, 513, 113

(56) References Cited

U.S. PATENT DOCUMENTS

| | | | | | |
|---|---|---|---|---|---|
| 2,917,288 | A | * | 12/1959 | Simms, Jr. et al. | 257/276 |
| 4,374,469 | A | * | 2/1983 | Rannenberg | 62/402 |
| RE32,100 | E | * | 4/1986 | Rannenberg | 62/80 |
| 5,086,622 | A | * | 2/1992 | Warner | 62/88 |
| 5,121,610 | A | * | 6/1992 | Atkinson et al. | 62/151 |
| 5,934,083 | A | * | 8/1999 | Scherer et al. | 62/79 |

* cited by examiner

Primary Examiner—Denise L. Esquivel
Assistant Examiner—Marc Norman
(74) Attorney, Agent, or Firm—Patrick M. Griffin

(57) ABSTRACT

An air cycle automotive air conditioning system for providing conditioned air to an automotive passenger compartment (20) includes an air compressor (10) tandemed to an expander (12). The expander (12) is efficiently run so as to expand air to a very low temperature, sending recovered work back to the compressor (10). The very cold expander air is then mixed with warmer air from other sources, providing a proper volume flow and temperature of air to the passenger compartment (24).

1 Claim, 1 Drawing Sheet

VEHICLE AIR CYCLE AIR CONDITIONING SYSTEM

This application claims priority from provisional application No. 60/157,576, filed Oct. 4, 1999.

BACKGROUND OF THE INVENTION

This invention relates to air conditioning systems in general, and specifically to a mobile air conditioning system that uses ambient air as the refrigerant and excess engine heat as a comfort heat source.

The conventional vehicle passenger air conditioning system, broadly defined to include both cooling and heating of the interior air, uses two closed systems, both of which depend, directly or indirectly, on the operation of the internal combustion engine. The air cooling system is a closed cycle, refrigerant vapor compression system that typically includes a compressor, a condenser, an expansion device, an evaporator and a refrigerant reservoir. These components are connected by means of suction, discharge, and liquid lines to form a closed, sealed system through which the refrigerant flows. The most common refrigerant is now R-134a, chosen within the last few years as a non ozone damaging alternative to the prior chlorinated fluorocarbons. Because the system is closed and sealed, air for the passenger spaced is cooled indirectly by blowing it over the evaporator, concurrently warning the refrigerant in the evaporator, which is cycled back to the compressor to be compressed, cooled in the condenser, expanded by the expansion device and then routed back to the evaporator to complete the cycle. The air heating system is another closed system, but is not pressurized. A portion of the heated, liquid coolant is diverted and pumped from the internal combustion engine cooling system, routed to heat exchanger called a heater core, and vehicle interior air is blown over it. The evaporator and heater core and generally packaged within one housing, the air heating and cooling systems are essentially independent.

While the newer R-134 refrigerant is ozone friendly, it is still considered a so called "greenhouse gas," that is, a gas that absorbs heat more readily than pure air. Pure air, of course, has no such greenhouse potential, by definition, and could be used directly in a passenger comfort system, rather than indirectly, potentially eliminating at least the evaporator. Ambient air is also cost free and readily available, and can be used at low pressure, unsealed system, all of which make it an attractive alternative, if a workable, practical system could be devised for an automotive application.

Open air cycle air conditioning systems in other mobile applications, such as airplanes, are known. Unlike the vapor compression system, the air cycle system does not use a refrigerant, which undergoes phase change as it flows through the system. Instead it depends for its operation on the processes of compression and expansion of air. In a typical airplane, there is a ready availability of compressed air, which can be tapped directly off the main engine supercharger or jet engine compressor. This compressed air is then expanded in a cooling turbine to provide chilled air for comfort cooling and pressurization of the passenger cabin. There is no such gratuitous supply of compressed air in a conventional automobile or truck, and, therefore adaptation of the air cycle air conditioning to such an application is not so straightforward. Moreover, the ambient temperature and humidity levels for a land-based vehicle are significantly more unfavorable compared to those for an airplane at an altitude of about 20,000 ft. above sea level.

SUMMARY OF THE INVENTION

The subject invention discloses an air cycle system for a motor vehicle directed to both heating a cooling of the passenger air, and directed to either an internal combustion vehicle, or electric powered, or a hybrid of the two. While the preferred embodiment disclosed is an open air cycle system, or one in which the working fluid and the air delivered to the passenger space are the same, a closed air cycle system is also possible The invention is also directed at taking advantage of additional features of the air cycle system such as instantaneous heating of the passenger compartment for comfort and defrosting and supercharging for internal combustion drive engines to increase efficiency.

DESCRIPTION OF THE PREFERRED EMBODIMENT

Figure 1:
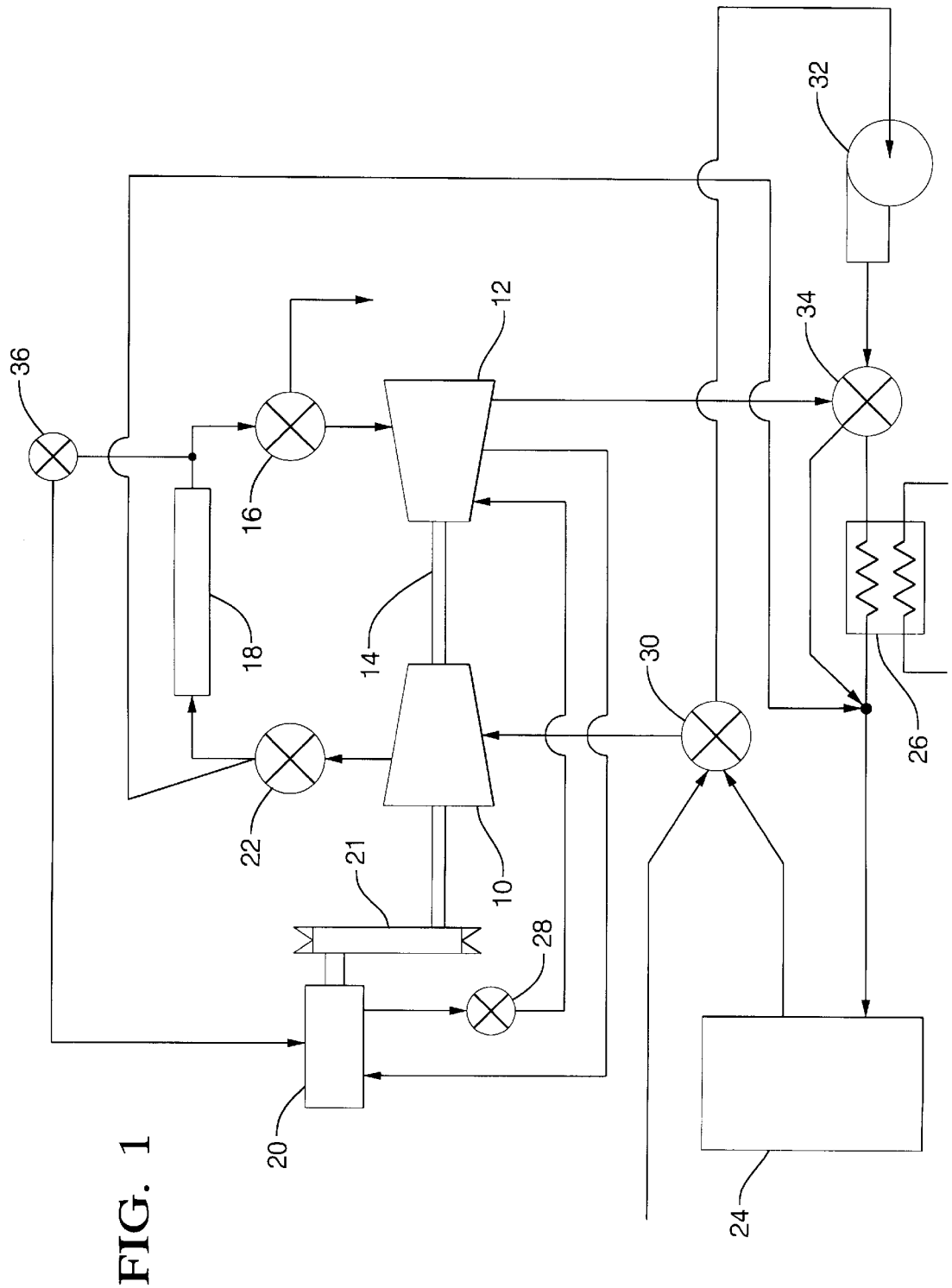
FIG. 1 is a schematic view of the various components of the system.

A preferred embodiment of the open air cycle components in the motor vehicle air conditioning system is shown in FIG. 1. The basic design philosophy involved in integrating the basic open air cycle with the automotive air conditioning system is to retain as many of the conventional vapor compression air conditioning components and features as possible, and to dispose the new components in such a way that there is the least disruption in the engine or passenger compartment. The major change in the basic HVAC module, as noted above, is the elimination of the conventional evaporator. This results in smaller and simpler HVAC module. Elimination of the conventional automotive compressor and its replacement by the compressor and expander tandem of the air cycle system does not cause any accommodation problems in the engine compartment as the physical size and weight of the compressor and expander tandem are similar to the conventional compressor. The addition of the water separator of the air cycle system requires some additional under-the-hood space. Elimination of the refrigerant reservoir of the conventional air conditioning system offsets this space requirement to some extent. Advantages include the fact that the new system can accommodate conventional modes of operation, including heating, cooling and dehumidification. The air cycle can also offer some novel features that are not provided by a conventional vapor compression system.

A compressor, 10, is powered either by a vehicle engine 20 through a pulley and belt drive arrangement, 21, or similar power coupling or from a directly coupled electric motor, not shown. The compressor 10 is preferably a low speed compressor to facilitate its coupling with the engine drive shaft turning at rotational speeds in the range of 1000 to 6000 revolutions per minute. Compressor 10 would preferably have the ability to deliver constant flow rate of air over the aforementioned range of the engine rotational speed. From the standpoint of system integration, the air cycle compressor 10 takes the place of the conventional automotive air conditioning compressor.

An expander 12 is connected to the compressor via a common shaft 14, or otherwise associated in tandem, so that the work done by the expanding air within the expander 12 can be directed back to the compressor 10 to increase overall efficiency of the system. The compressor 10 and expander 12 are preferably located in the same housing with inlet and outlet ports for the ambient and conditioned air streams. A desirable attribute of the compressor and expander shaft 14 is that it should be equipped with self-actuating air bearings to obviate the need for any lubrication. From the point of view of system integration, the air cycle compressor 10 and expander 12 tandem takes the space normally occupied by the conventional automotive air conditioning compressor. Moreover, the combined weight of the compressor 10 and expander 12 tandem is similar to the weight of the conventional automotive air conditioning compressor.

A front-mounted air-to-air heat exchanger 18 is provided, which is capable of lowering the temperature of the hot compressed air from the compressor 10 prior to expansion. The cooler air is first run to a water separator 16, and its cooling improves the efficiency of the water separator 16 as well as providing a source of cooled charge air to the internal combustion engine 20 for supercharging, if desired. There are several unique features of the heat exchanger 18. Whereas the conventional air-to-air heat exchangers for various applications are designed with the intent to maximize the heat transfer rate, in the present instance the heat exchanger 18 is designed with the intent to minimize the pressure drop on the process side. It is of paramount importance that the process side pressure drop in this heat exchanger 18 be kept as low as possible in order to ensure that the work of compression is as low as possible and the work of expansion is as high as possible. The total pressure drop in the heat exchanger 18 should be in the range of 1 to 2 psia. The inlet and outlet tubes of the heat exchanger 18 are also carefully designed to minimize process side pressure drop. The hot compressed air enters the heat exchanger 18 through 1.5 in. diameter×6 in. long inlet tube, while the cold compressed air leaves the heat exchanger through an outlet tube of the same dimensions. From the standpoint of system integration, the front-end heat exchanger 18 takes place of the condenser in the conventional vapor compression air conditioning system, and is similarly sized.

Water separator 16, as noted, is upstream of the expander 12 where the air pressure is higher than that at the expander outlet. The water separation occurs once the moist air temperature drops below the dew point, which is dependent on the pressure. The higher the pressure the higher is the dew point. For example, an air stream with an absolute humidity of 0.0167 lb of water per lb of dry air at atmospheric pressure has a dew point of 71.4° F. whereas the same air stream with the same absolute humidity but twice the pressure has a dew point of 92.7° F. The higher pressure and hence higher dew point facilitates water separation without the complications of water freezing. Inclusion of the high-pressure water separator 16 upstream of the expander 12 aids the overall efficiency of the system by allowing the expander 12 to expand air to the point where its temperature is below freezing.

A multi-function air mix temperature control valve 34 is provided, the function of which is to mix a combination of cold, processed air from expander 12 and ambient make up air from an air inlet valve 30 (shown entering by the arrow), as well as to proportion the resultant mixture through and around a liquid heater core, 26, as required for interior comfort or glass clearing. Cold processed air enters the mix valve 34 under the power provided by compressor 10 while a blower 32 provides make up air and provides flow under situations where the compressor, 10, and expander, 12, may be de-activated for efficiency reasons. The air mix valve 34 comprises three ports namely, a cold process air inlet port, make up air inlet port and conditioned air outlet port. Located between the two inlet ports is an air mix door to regulate the amounts of two inlet air streams. The air mix valve 34 also includes a temperature sensor and a humidity sensor located in the conditioned air exit port to regulate the temperature, humidity and flow of the conditioned air. Use of the air mix valve 34 helps achieve the following key objectives in the present invention. First, for a given amount of conditioned air (processed air+unprocessed ambient or recirculated air), the work of compression is reduced. In the conventional air cycle, the work of compression is proportional to the amount of conditioned air while in the air cycle of the present invention, the work of compression is proportional to the amount of processed air which is about half the amount of the conditioned air. Second, control is gained over the desired volume of the conditioned air as well as over its dry bulb temperature and absolute humidity. Third, by reducing the amount of air to be processed by the air cycle machine, it is possible to utilize low speed reciprocating or scroll machinery. The conventional air cycle, with relatively large amount of air to be processed, requires the use of high-speed centrifugal machinery.

The liquid heater core 26 derives heat from the engine coolant. Its function is to raise the temperature of the air tempered by the air mix valve 34. The tempered air from the air mix valve 34 may be routed either directly to a passenger compartment 24, or passed first through the core 26 to raise its temperature to that required for comfort or glass clearing.

A blower 32 delivers ambient or recirculated air to the air mix temperature control 34 and provides air flow for heating and defrosting and to allow the compressor 10 and expander 12 to be de-activated when not required. De-activating the compressor expander unit will reduce energy requirements. The blower 32 is of conventional design housed in the HVAC module of the automobile air conditioning system.

A hot air bypass valve 22 is provided to throttle down the hot compressed air and direct it to the passenger compartment 24 when needed. The hot air bypass valve 22 comprises two key components: a short orifice tube with 0.050 in. diameter and a valve which opens on command during engine warm up when the thermostat is closed restricting engine coolant to the engine block. The opening of the hot air bypass valve 22 provides instant hot air to the passenger compartment 24 in circumstances where the conventional heater core 26 has not yet become sufficiently hot in cold weather operation. Not only does this feature provide instantaneous heat for comfort and safety, it also helps in reducing cold start emission problem. Neither a conventional vapor compression air conditioning system nor a conventional power train cooling system is capable of providing this extremely useful feature An air inlet valve 30 selectively routes ambient (outside) air, or air recirculated from the passenger compartment 24, or a combination of the two, to either the compressor 10, or to the inlet of a conventional HVAC air blower 32, or both.

An engine coolant bypass valve 28 directs warm engine coolant to the outlet or wall of the expander 12 to prevent icing that could otherwise be caused by the sub-freezing temperature at which the expander 12 is operated. It may be noted that although the expander wall is maintained above the freezing point of water, the air mean temperature could be well below the freezing point of water due to the existence of temperature gradient within the air stream. The heating of the expander wall for low temperature operation could also be provided by ambient air, air re-circulated from the passenger compartment 24, an externally operated heater, or the use of a suitable phase change medium in the walls of the expander 12. However, these techniques are either ineffective or inefficient. A cold air bypass valve 36 is provided to direct high-density air to the internal combustion engine 20 to enhance its efficiency and thereby boost its power output. In a practical air cycle system this feature comes into play only when comfort cooling is not needed.

The conventional vapor compression system is incapable of providing this feature.

What is claimed is:

1. An air cycle automotive air conditioning system for providing conditioned air to an automotive passenger compartment (20), comprising, an air compressor (10) to receive and compress ambient air, an air to air heat exchanger (18) to receive compressed air from said compressor (10) and cool it by heat exchange to the ambient, a water separator (16) to receive compressed, cooled air from said heat exchanger (18) and remove water therefrom, an expander (12) to receive compressed, cooled and dried air from said water separator (16) and expand it to a below freezing temperature, said expander (12) being operationally joined in tandem to said compressor (10) in order to recover work done by said expanding air back to said compressor (10), an air inlet valve (30) to selectively provide ambient air, or air from said passenger compartment (24), or a combination thereof, both to said compressor (10) and selectively to another destination an air mix temperature control valve (34) to receive both cold air from said expander (12) and a combination of warmer ambient air or passenger compartment air from said air inlet valve (30) and proportion the two air sources into a sufficient volume, mid temperature air flow to be sent to said passenger compartment (24), whereby said expander (12) may be run more efficiently to an air temperature below freezing, providing more recovered work to said compressor (10) while the cold air from said expander (12) can be mixed with other air to provide the necessary temperature and flow of air to said passenger compartment (24).

\* \* \* \* \*